(12) United States Patent
Hevenor et al.

(10) Patent No.: US 12,079,640 B1
(45) Date of Patent: Sep. 3, 2024

(54) PLATFORM VERIFIED ADD-ON RESOURCES

(71) Applicant: Pivotal Software, Inc., San Francisco, CA (US)

(72) Inventors: Adam Hevenor, Denver, CO (US); Jason Keene, Denver, CO (US)

(73) Assignee: Pivotal Software, Inc., Palo Alto, CA (US)

(*) Notice: Subject to any disclaimer, the term of this patent is extended or adjusted under 35 U.S.C. 154(b) by 0 days.

(21) Appl. No.: 16/351,260

(22) Filed: Mar. 12, 2019

(51) Int. Cl.
*G06F 9/445* (2018.01)
*G06F 8/65* (2018.01)
*G06F 21/57* (2013.01)

(52) U.S. Cl.
CPC ............ *G06F 9/44526* (2013.01); *G06F 8/65* (2013.01); *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,572,635 B2 | 10/2013 | Craddock | |
| 10,187,323 B2 | 1/2019 | Laplanche et al. | |
| 2009/0247124 A1* | 10/2009 | de Atley | H04M 1/72525 455/410 |
| 2012/0005017 A1* | 1/2012 | Gupta | G06Q 30/02 705/14.49 |
| 2012/0204187 A1 | 8/2012 | Breiter et al. | |
| 2013/0219060 A1 | 8/2013 | Sturgeon | |
| 2013/0232463 A1 | 9/2013 | Nagaraja et al. | |
| 2013/0238795 A1 | 9/2013 | Geffin | |
| 2013/0339949 A1* | 12/2013 | Spiers | G06F 9/45558 718/1 |

(Continued)

FOREIGN PATENT DOCUMENTS

WO 2015/184179 12/2015

OTHER PUBLICATIONS

International Search Report and Written Opinion in International Application No. PCT/US2017/049910, dated Nov. 27, 2017, 18 pages.

(Continued)

*Primary Examiner* — Charles E Anya
(74) *Attorney, Agent, or Firm* — King Intellectual Asset Management

(57) ABSTRACT

Methods, systems, and apparatus, including computer programs encoded on computer storage media for a platform orchestrator to use verified add-on resources. One of the methods includes receiving, by a platform orchestrator, an add-on resource API command that references an add-on resource installed on one or more software platforms launched by the platform orchestrator. A request to execute the add-on resource API command is provided to a platform controller of a software platform of the one or more software platforms launched by the platform orchestrator. The add-on resource API command is executed including identifying one or more instances of the add-on resource referenced by the add-on resource API command that are executed as workloads on the software platform launched by the platform orchestrator.

21 Claims, 3 Drawing Sheets

(56) References Cited

U.S. PATENT DOCUMENTS

| | | |
|---|---|---|
| 2014/0280918 A1 | 9/2014 | Grandhe |
| 2014/0280964 A1 | 9/2014 | Farooq |
| 2014/0280966 A1 | 9/2014 | Sapuram |
| 2014/0282037 A1 | 9/2014 | Narasimhan |
| 2014/0282525 A1 | 9/2014 | Sapuram et al. |
| 2014/0282536 A1 | 9/2014 | Dave |
| 2014/0317166 A1 | 10/2014 | Iyoob |
| 2014/0324647 A1 | 10/2014 | Iyoob |
| 2014/0365662 A1 | 12/2014 | Dave |
| 2015/0026349 A1 | 1/2015 | Iyoob |
| 2015/0134965 A1* | 5/2015 | Morenius ............ G06F 9/45533 713/172 |
| 2015/0156065 A1 | 6/2015 | Grandhe |
| 2015/0188927 A1 | 7/2015 | Santhi |
| 2015/0378708 A1 | 12/2015 | Nagaraja et al. |
| 2015/0381435 A1 | 12/2015 | Todd |
| 2016/0019636 A1 | 1/2016 | Adapalli |
| 2016/0048400 A1* | 2/2016 | Yang ....................... H04L 67/34 718/1 |
| 2017/0364549 A1 | 12/2017 | Abalos |
| 2018/0069804 A1 | 3/2018 | Laplanche et al. |
| 2018/0276009 A1* | 9/2018 | Williams ............ G06F 9/44526 |
| 2019/0042325 A1* | 2/2019 | Nair ....................... G06F 11/00 |
| 2019/0097969 A1* | 3/2019 | Voss ........................ H04L 67/10 |
| 2019/0104182 A1* | 4/2019 | Elzur .................. H04L 41/5025 |
| 2019/0138286 A1* | 5/2019 | Sugaya ..................... G06F 8/63 |
| 2019/0163460 A1* | 5/2019 | Kludy .................. H04L 9/3213 |
| 2019/0227791 A1* | 7/2019 | Norris ..................... G06F 8/658 |
| 2020/0073692 A1* | 3/2020 | Rao ..................... H04L 12/4633 |

OTHER PUBLICATIONS

PCT International Preliminary Report on Patentability in International Application No. PCT/US2017/049910, dated Mar. 14, 2019, 12 pages.

* cited by examiner

PLATFORM VERIFIED ADD-ON RESOURCES

BACKGROUND

This specification generally relates to cloud computing software platforms.

A cloud software platform is a platform-as-a-service ("PaaS") cloud computing system that allows users to deploy and manage multiple instances of software workloads. In this specification, a workload refers generally to one or more software tasks to be executed by a software application platform. Each task can be implemented by a package, a utility, or an executable, to name just a few examples. The tasks of a workload commonly include both components that are in active development by the entity that deploys the workload as well as off-the-shelf software components. The software workloads are then executed by hardware of an underlying cloud computing infrastructure, which may or may not be maintained by a different entity, e.g., an entity providing an infrastructure-as-a-service ("IaaS") platform. A cloud software platform thus functions as a software layer between the cloud computing infrastructure and the workloads executing on the infrastructure.

One simple example of a workload that can be deployed on a cloud software platform is an online movie database. One software task can implement the front-end user interface, and another task can execute an off-the-shelf database package that implements backend database functionality. Additionally, another software task of the workload can execute a third-party application that tracks usage statistics of the online movie database by end users who access the database over the Internet.

One of the over-arching goals of cloud software platforms is self-service, which refers to a number of related functionalities that allow a developer or a platform administrator to launch workloads without cumbersome configuration and without intervention or approval by another person or entity. To that end, a cloud software platform can provision resources in the underlying cloud computing infrastructure as well as stage, launch, and configure workloads using the provisioned resources. Therefore, developers who use the cloud software platform need not spend time acquiring, building, or configuring the hardware of the underlying cloud computing infrastructure. Rather, the developers can focus on development and integration of software tasks of the workloads themselves, and the developers can rely on the services provided by the cloud software platform to launch and manage instances of the workloads.

A cloud software platform generally has multiple components that implement the software layer on top of the cloud computing infrastructure. Deploying these software components that implement a software platform can be performed by a software system known as a platform orchestrator. In this specification, a platform orchestrator is a software system that provisions resources for and configures the components of a software platform, which for brevity may be referred to as the platform orchestrator launching the software platform. One example of a platform orchestrator is Pivotal Container Service (PKS). PKS provides developers with an interface that allows them to set up and configure a Kubernetes cluster, which is an example of a cloud software platform. A Kubernetes cluster is a container orchestrator that manages the execution of workloads in containers. A Kubernetes cluster generally includes a master node and one or more worker nodes that can execute workloads in containers and ensure that the workloads continue stateful execution even in the presence of software or hardware failures. Thus, a developer can issue a handful of command-line commands to PKS, and PKS can provide the functionality of automatically provisioning resources for and configuring the nodes of a Kubernetes cluster that executes on the underlying cloud computing platform.

Platform orchestrators help effectuate the self-service goals of cloud software platforms in a number of different use cases. For example an organization can install a platform orchestrator. Thereafter, development teams within the organization can use the platform orchestrator to launch their own independently operating software platforms. The development teams can then develop and launch workloads on those respective software platforms. The platform orchestrator thus removes the need for a centralized team to set up and configure multiple different software platforms within the organization.

However, the self-service features provided by platform orchestrators introduces some risks and disadvantages. First, it is generally difficult for an organization to know what kinds of workloads are being run on the many independently operating software platforms. Second, it is difficult for an administrator in the organization to address known security risks. For example, if a particular off-the-shelf software package that is part of a software workload is discovered to contain a vulnerability, addressing the vulnerability across the entire organization requires significant manual labor. For example, an administrator may have to contact all the platform administrators of all the independently operator software platforms and ask them to check to see if they are running the vulnerable package and, if so, to upgrade or disable the package. Successfully eradicating the vulnerability across the entire organization therefore requires participation and manual cooperation by potentially many different platform administrators.

SUMMARY

This specification describes how a platform orchestrator can use a verified add-on resource API to effectuate modifications of add-ons installed on software platforms launched by the platform orchestrator.

Particular embodiments of the subject matter described in this specification can be implemented to realize one or more of the following advantages. Using verified add-ons obtained through a verified add-on system provides platform orchestrators with some degree of centralized functionality relating to add-ons installed on software platforms launched by the platform orchestrators. The verified add-on system provides a level of trust for platform administrators while maintaining the self-service goals of software platforms. These functionalities make the execution environment safer by allowing for the automatic upgrading or disabling of problematic add-ons executing on software platforms. In addition, the platform becomes safer because the verified add-on functionality allows for rapid assessment of the security impacts of add-on vulnerabilities. This allows organizations or platform operators to quickly respond to a system vulnerability introduced by a platform-add on, e.g., by using a centralized control system to disable all installed instances of the add-on or by automatically patching the vulnerability by upgrading the add-on.

The details of one or more embodiments of the subject matter described in this specification are set forth in the accompanying drawings and the description below. Other

BRIEF DESCRIPTIONS OF DRAWINGS

Like reference numbers and designations in the various drawings indicate like elements.

DETAILED DESCRIPTION

Figure 1:
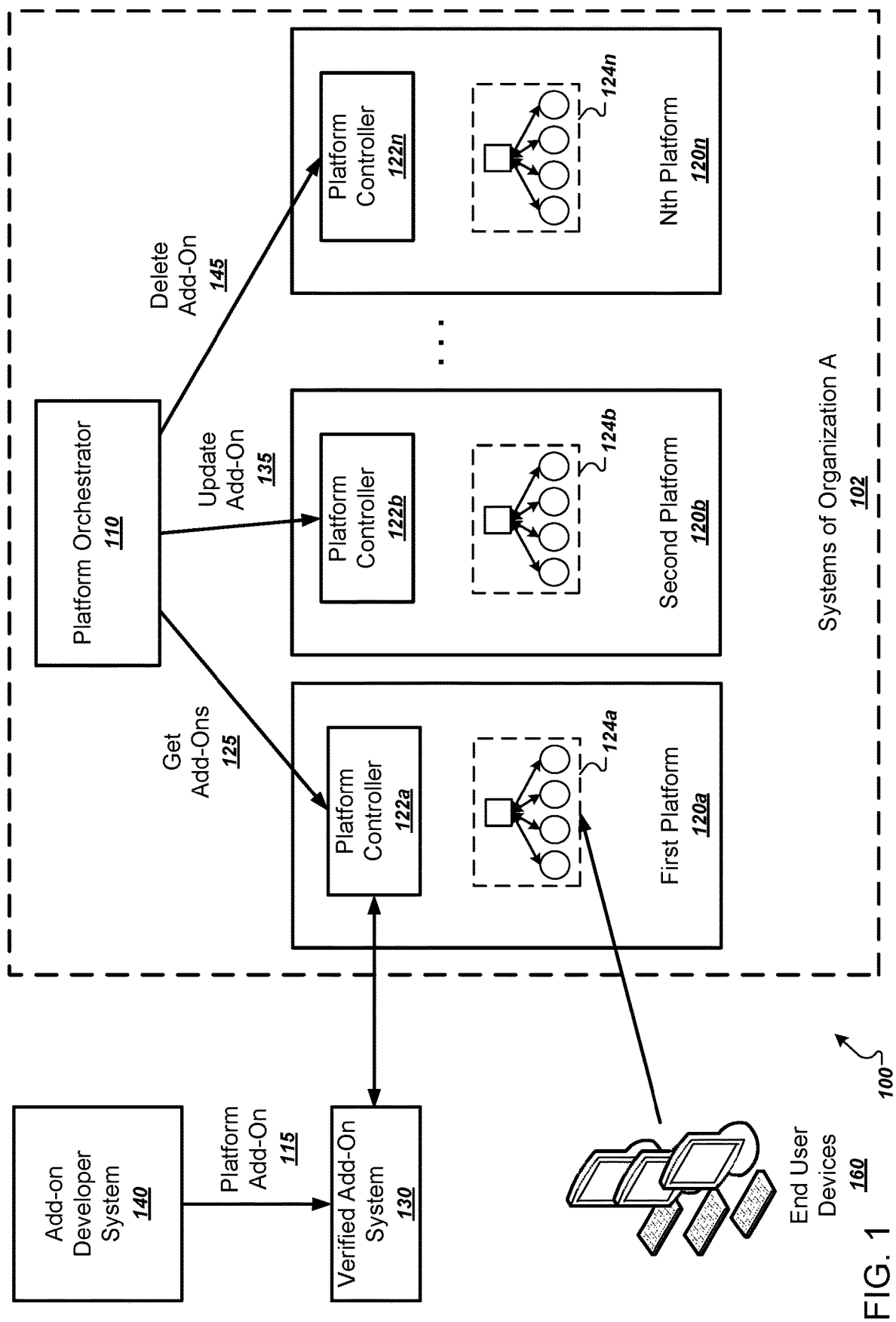
FIG. 1 illustrates an example system that uses verified add-on resources.

FIG. 1 illustrates an example system 100 that uses verified add-on resources. The system 100 includes a platform orchestrator 110 that can launch multiple different software platforms 120a, 120b, through 120n. As described above, each software platform can execute workloads using computing resources of the underlying cloud computing infrastructure. The computing resources can be virtual machines that provide machine-level virtualization or containers that provide operating-system-level virtualization, to name just a few examples. In this example, the platform orchestrator 110 and the software platforms 120a-n are maintained and controlled by a single organization A. Thus, they can collectively be referred to as the systems of organization A 102.

Each platform 120a-n has a respective platform controller, e.g., the platform controllers 122a-n. Each platform controller is a software component that implements a verified add-on application programming interface (API) to be used by the platform orchestrator 110. As will be described in more detail below, the verified add-on API is an API that supports inspection of and modification of verified add-ons installed on the platforms 120a-n without requiring the approval or intervention of a platform administrator that is responsible for the software platform on which the command is executed.

In this example, all of the software platforms 120-an are illustrated as having a respective cluster of nodes 124a-n, each cluster having a master node and multiple worker nodes. Thus, each of the clusters 124a-n could be implemented as a Kubernetes cluster, and the platform orchestrator could be implemented using PKS.

However, the platforms 120a-n can be different so long as each platform has a controller that implements the verified add-on API. For example, one of the platforms could be a cloud application platform that is optimized for implementing stateless applications.

The workloads executing in the software platforms 120a-n can in some cases be accessed by end user devices 160. In that case, the requests from the end user devices can go directly to the executing workloads and may be routed by components of the software platforms 120a-n.

The system 100 also includes an add-on developer system 140, which is a computer system of an add-on developer entity that provides platform add-ons 115. Platform add-ons 115 are software components that are compatible with one or more of the software platforms 120a-n. The add-on developer may be part of organization A, but is typically a different entity that publishes platform add-ons. For example, in the online movie database example described above, the add-on developer entity can publish an add-on that maintains usage statistics, e.g., usage statistics of accesses by end user devices 160. In some implementations, the platform add-ons 155 include integrated services that that can be selected by platform operators or workload developers through a service broker API. Suitable techniques for providing integrated services for a software platform are described in commonly owned U.S. patent application Ser. No. 16/173,639, filed on Oct. 29, 2018, entitled "Independent Services Platform," which is herein incorporated by reference. In some other implementations, the platform add-ons 115 are other software modules that are not installed as integrated services through a service broker API. For example, the platform add-on 115 can be a software module that is not available in a services marketplace exposed by the service broker API of a particular platform. An organization can thus impart some control and visibility into such non-service add-ons by using the verified add-on system 130.

The system 100 also includes a verified add-on system 130. The verified add-on system receives platform add-ons 115 published by add-on developer entities, e.g., the add-on developer system 140. The verified add-on system then repackages the received add-on into an add-on resource. In this specification, an add-on resource is a software component that supports one or more functionalities of the verified add-on API. For example, generating an add-on resource can include generating a package that adds metadata that identifies the author of the add-on, a version of the add-on, and a license identifier of the add-on. This information can then be accessed by platform controllers 122a-n in order to implement the verified add-on API. This mechanism of generating add-on resources also helps the verified add-on system to verify the identity and license information provided by the add-on developer entities.

Platform administrators can then install verified add-on resources by communicating with their respective platform controllers. For example, a platform administrator of the first platform 120a can issue a command to the platform controller 122a to install the usage statistics verified add-on. The platform controller 122a can then install the verified add-on in the cluster 124a.

Thereafter, the platform orchestrator 110 can use the verified add-on API to inspect and modify verified add-on stored in any of the platforms 120a-n. For example, the platform orchestrator 110 can issue a get add-ons command 125 to the platform controller 122a. In response, the platform controller 122a can provide information about add-on resources executing on the cluster 124a. The platform orchestrator 110 can also issue an update add-on command 135 to the platform controller 122b. In response, the platform controller 122b can update the verified add-on resources executing in the cluster 124b, e.g., by obtaining an updated version from the verified add-on system 130. Add the platform orchestrator 110 can issue a delete add-on command 145 to the platform controller 122n. In response, the platform controller 122n can delete all identified add-on resources executing in the cluster 124n.

Figure 2:
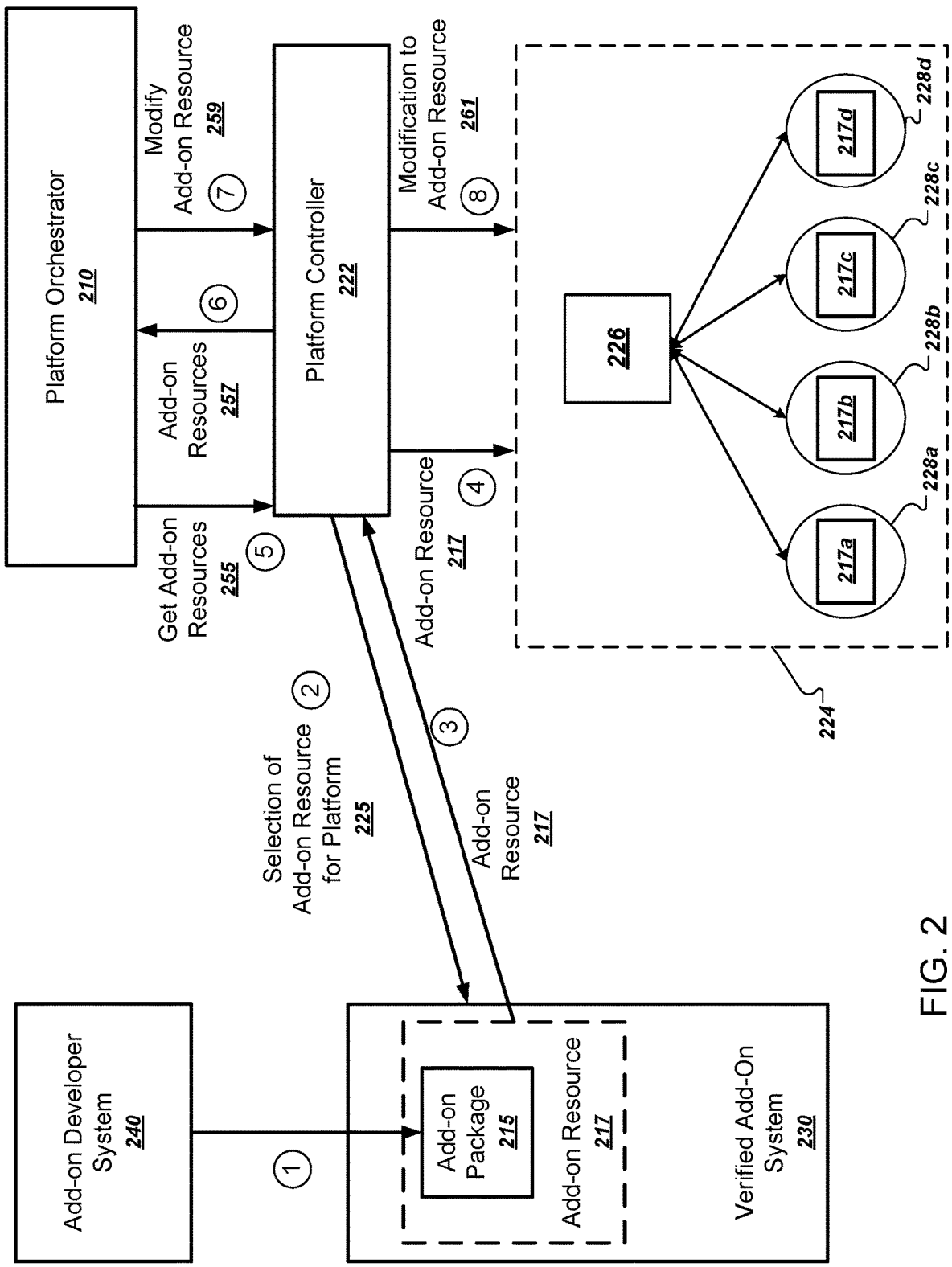
FIG. 2 is a diagram that illustrates the sequence of operations for using verified add-on resources.

FIG. 2 is a diagram that illustrates the sequence of operations for using verified add-on resources. In this example, a platform orchestrator 210 has launched a software platform having a cluster 224 and a platform controller 222. For example, the cluster 224 can be a container cluster. Suitable techniques for launching a container cluster are described in commonly-owned U.S. patent application Ser. No. 16/207,689, filed on Dec. 3, 2018, entitled "On-Demand Cluster Creation and Management," which is herein incorporated by reference. A platform administrator will typically also provide one or more software tasks to be executed on the cluster 224.

At step 1, an add-on developer system 240 provides an add-on package 215 to a verified add-on system 230. The verified add-on system 230 can then repackage the add-on package 215 as add-on resource 217. The add-on resource can include metadata for implementing one or more functions of the verified add-on API as described above.

At step 2, the platform controller 222 makes a selection of the add-on resource 225. For example, a platform administrator of the launched platform can issue a command to the platform controller 222, either through a graphical user interface or through a command line interface, that causes the platform controller 222 to provide the selection of the add-on resource 225. As part of this process, the verified add-on system can provide a listing of available add-on resources that are compatible to be executed in the cluster 224. A platform administrator of the launched platform can browse the listing in order to select the add-on resource to be installed in the cluster 224. This example illustrates the self-service functionality provided by the platform orchestrator 210 and the platform controller 222. In other words, these components give platform administrators the power to launch platforms and install add-on resources to be executed on the platforms.

At step 3, the verified add-on system provides the add-on resource 217 to the platform controller. At step 4, the platform controller 222 provides the add-on resource 217 to the cluster 224 to be installed on each of multiple worker nodes 228a-d of the cluster 224. The platform controller 222 may or may not need to employ functionality of the master node 226 of the cluster 224. In other words, the master node 226 can install the add-on resource 217 on each of the worker nodes 228a-d, or the platform controller 22 can install the add-on resource 217 directly.

At step 5, the platform orchestrator 210 uses the verified add-on API to issue a get add-on resources command 255. A systems administrator using the platform orchestrator 210 can issue a command to the platform orchestrator 210, e.g., through a command line or a graphical user interface. For example, the systems administrator can issue the following example command line command to the platform orchestrator 210:

$> po get-add-ons first-platform

The first term of the example command, "po," names the platform orchestrator 210 as the system that should handle the command. The next term of the example command, "get-add-ons," names a functionality of the verified add-on API, namely, the functionality to list all verified add-on resources that are installed on one or more platforms. The last term of the example command, "first-platform," names one of the platforms launched by the platform orchestrator 210. In some implementations, if the last term is omitted, the platform orchestrator 210 can issue the verify add-on command to all platform controllers of all platforms launched by the platform orchestrator 210.

In response to receiving the get add-on resources command 255, the platform controller 222 automatically inspects the verified add-on resources that are executing on the cluster 224. The platform controller 222 implement this functionality in a number of ways. For example, the platform controller can maintain a listing of all add-on resources that were retrieved from the verified add-on system 230. Alternatively or in addition, the platform controller can query the master node 226, the worker nodes 228a-d, or some combination of these, to obtain information about add-on resources that are installed.

At step 6, the platform controller 222 responds to the platform orchestrator 210 with a list of add-on resources 257 that are installed on the platform. As part of this process, the platform controller 222 can obtain and provide to the platform orchestrator 210 the metadata that was added by the verified add-on system 230 when generating the add-on resource during step 1.

The systems administrator can thus issue a single command line command to obtain information about all add-ons executing on a single platform or on all platforms. Notably, this process did not require the assistance or intervention of any platform administrators who launched the respective platforms.

In some implementations, the platform controllers also gather information about non-verified add-ons. Non-verified add-ons are software components installed on the software platforms that are not obtained through the verified add-on system 230. Thus, the platform controllers can optionally provide information about installed verified add-ons as well as installed non-verified add-ons.

At step 7, the platform orchestrator 210 uses the verified add-on API to issue a modify add-on resource command 259. The systems administrator using the platform orchestrator 210 can issue the command through a command line or a graphical user interface. The requested modification can be a request to upgrade, disable, enable, or delete an add-on resource.

At step 8, the platform controller 222 executes the requested modification to the add-on resource 261 in order to effectuate the request. Thus, the platform controller can upgrade, disable, enable, or delete the add-on resources 217a-d executing in the cluster 224. Again, this process notably did not require the assistance or intervention of any platform administrators who launched the respective platforms.

For example, the systems administrator can issue the following example command to the platform orchestrator 210 in order to update an add-on resource:

$> po update add-on1 version2.0 first-platform

The second term of the example command, "update," names a functionality of the verified add-on API, in this case the update functionality. The third term, "add-on1," names an add-on, and the fourth term, "version2.0," names an updated version of the add-on. The last term names one of the platforms launched by the platform orchestrator 210. Again, in some implementations, if the last term is omitted, the platform orchestrator 210 can issue the update command to all platform controllers of all platforms launched by the platform orchestrator 210. The platform controllers can then implement the update command by retrieving the specified update version from the verified add-on system, disabling or deleting the named add-on, and installing the updated version.

As another example, the system administrator can issue the following example command to the platform orchestrator 210 in order to delete an add-on resource:

$> po delete add-on1 first-platform

The second term of the example command, "delete," names the delete functionality of the verified add-on API. The third term, "add-on1," names an add-on, and the last term names one of the platforms launched by the platform orchestrator 210. Again, in some implementations, if the last term is omitted, the platform orchestrator 210 can issue the delete command to all platform controllers of all platforms launched by the platform orchestrator 210. The platform controllers can then implement the delete command by deleting the named add-on.

These examples illustrate how a systems administrator can use the platform orchestrator to quickly address vulnerabilities or other issues with add-ons that have been added by platform administrators on the various platforms. For example, if any platform is executing software having an invalid license, the systems administrator can address the issue by deleting or upgrading the add-on without requiring the assistance or intervention by a platform administrator. As another example, if a vulnerability is discovered with an add-on, the systems administrator or platform operator can quickly disable the add-on or automatically update the add-on if a patch is available to address the vulnerability.

The system can also use the verified add-on functionality for other system maintenance functions. In some implementations, the system combines the verified add-on functionality with a billing system in order to monitor and gauge software license compliance.

Figure 3:
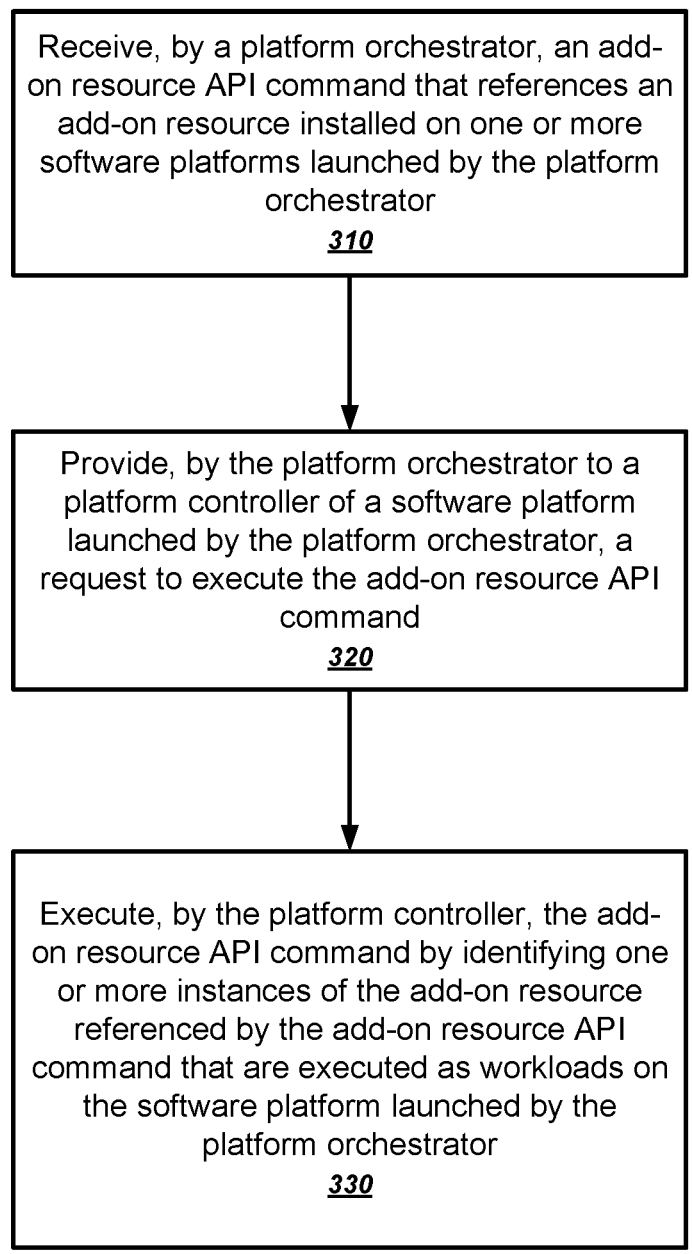
FIG. 3 is a flowchart of an example process for executing verified add-on resource API commands.

FIG. 3 is a flowchart of an example process for executing verified add-on resource API commands. For convenience, the process will be described as being performed by components of a distributed system having a plurality of computers in an underlying cloud computing system and programmed appropriately in accordance with this specification. For example, components of the system 100 of FIG. 1, appropriately programmed can perform the example process.

A platform orchestrator receives an add-on resource API command that references an add-on resource installed on one or more software platforms launched by the platform orchestrator (310). As described above, a systems administrator can issue add-on resource API commands to the platform orchestrator.

The platform orchestrator provides, to a platform controller of a software platform launched by the platform orchestrator, a request to execute the add-on resource API command (320). The platform orchestrator can provide the command to a platform controller of a specifically identified software platform launched by the platform orchestrator or to all software platforms launched by the platform orchestrator.

The platform controller executes the add-on resource API command by identifying one or more instances of the add-on resource referenced by the add-on resource API command that are executed as workloads on the software platform launched by the platform orchestrator (330). As described above, the add-on resource API commands can include commands for retrieving a list of all add-on resources or modifying add-on resources, e.g., by upgrading, disabling, enabling, deleting, particular add-on resources. Notably, the execution of the add-on resource API command does not require the approval, intervention, or participation by any platform administrators who are responsible for the software platform. Therefore, a systems administrator using the platform orchestrator can effectuate immediate actions on the various software platforms launched by the platform orchestrator.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving, by a platform orchestrator, an add-on resource API command that references an add-on resource installed on one or more software platforms launched by the platform orchestrator;
providing, by the platform orchestrator to a platform controller of a software platform of the one or more software platforms launched by the platform orchestrator, a request to execute the add-on resource API command; and
executing, by the platform controller, the add-on resource API command by identifying one or more instances of the add-on resource referenced by the add-on resource API command that are executed as workloads on the software platform launched by the platform orchestrator.

Embodiment 2 is the method of embodiment 1, wherein the platform orchestrator is a software system that is configured to launch one or more independently operating software platforms.

Embodiment 3 is the method of embodiment 2, wherein an add-on resource is a software package that comprises an add-on package received from an add-on developer entity and metadata identifying the add-on developer entity.

Embodiment 4 is the method of embodiment 3, wherein the add-on resource is generated by a verified add-on system that is distinct from an add-on developer system of the add-on developer entity.

Embodiment 5 is the method of embodiment 4, wherein the platform controller is configured to install add-on resources retried from the verified add-on system.

Embodiment 6 is the method of any one of embodiments 1-5, wherein the add-on resource API command provided by the platform orchestrator is a command to retrieve a listing of add-on resources installed on the software platform,
wherein executing the add-on resource API command comprises inspecting, by the platform controller, all add-on resources installed on any computing resources of the software platform and providing, to the platform orchestrator, information listing one or more add-on resources installed on computing resources of the software platform.

Embodiment 7 is the method of any one of embodiments 1-6, wherein the add-on resource API command provided by the platform orchestrator is a command to delete an add-on resource installed on the software platform,
wherein executing the add-on resource API command comprises inspecting, by the platform controller, all instances of the add-on resource installed on any computing resource of the software platform and removing, from the software platform, all instances of the add-on resource installed on any computing resource of the software platform.

Embodiment 8 is the method of any one of embodiments 1-7, wherein the add-on resource API command provided by the platform orchestrator is a command to update an add-on resource installed on the software platform,
wherein executing the add-on resource API command comprises retrieving, by the platform controller, an updated version of the add-on resource referenced in the add-on resource API command and installing the updated version of the add-on resource referenced in the add-on resource API command.

Embodiment 9 is the method of any one of embodiments 1-8, wherein the add-on resource API command does not specify a software platform, and wherein the platform orchestrator is configured to provide the add-on resource API command to all platform controllers of a plurality of software platforms launched by the platform orchestrator.

Embodiment 10 is the method of any one of embodiments 1-9, wherein executing the add-on resource API command by the platform controller does not require approval by any platform administrators of the software platform.

A system comprising: one or more computers and one or more storage devices storing instructions that are operable, when executed by the one or more computers, to cause the one or more computers to perform the method of any one of claims 1 to 10.

A computer storage medium encoded with a computer program, the program comprising instructions that are operable, when executed by data processing apparatus, to cause the data processing apparatus to perform the method of any one of claims 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a first plurality of computers and one or more storage devices storing instructions that are operable, when executed by the first plurality of computers, to cause the first plurality of computers to perform operations comprising:
receiving, by a platform orchestrator, an add-on resource application programming interface (API) command that requests a modification to a particular add-on resource installed on a first plurality of different cloud computing platforms, wherein:
the add-on resource API command does not specify the first plurality of different cloud computing platforms;
each of the first plurality of different cloud computing platform comprises: i) a platform controller that implements APIs to be used by the platform orchestrator for modifying add-on resources installed on the first plurality of different cloud computing platforms, and ii) a plurality of nodes that each of the first plurality of different cloud computing platforms is configured to use to execute workloads;
the particular add-on resource:
is a software component on one or more of the first plurality of nodes within each of the first plurality of different cloud computing platforms;
supports one or more functionalities of the add-on resource API;
is compatible with the first plurality of different cloud computing platforms; and
implements additional functionality for the workloads of the first plurality of different cloud computing platforms; and
providing, by the platform orchestrator to each platform controller of the first plurality of different cloud computing platforms launched by the platform orchestrator, a request to execute the add-on resource API command;
providing, by the platform orchestrator to each platform controller of a second plurality of cloud computing platforms launched by the platform orchestrator, a request to execute the add-on resource API command; and
the request causing each of the platform controllers in the first and second pluralities of platform controllers to retrieve, from a verified add-on system, the add-on resource API corresponding to the add-on resource API command to effectuate the modification to the particular add-on resource installed on the first and second pluralities of different cloud computing platforms.

2. The system of claim 1, wherein the particular add-on resource comprises an add-on package received from an add-on developer entity and metadata identifying the add-on developer entity.

3. The system of claim 2, wherein the particular add-on resource is generated by the verified add-on system that is distinct from an add-on developer system of the add-on developer entity.

4. The system of claim 3, wherein the platform controller of each of the first plurality of different cloud computing platforms is configured to install add-on resources retrieved from the verified add-on system.

5. The system of claim 1, wherein the add-on resource API command provided by the platform orchestrator to the respective platform controller of each of the first plurality of different cloud computing platforms comprises a command to retrieve a listing of add-on resources installed on the cloud computing platform,
wherein executing the add-on resource API command comprises inspecting, by the respective platform controller of each of the first plurality of different cloud computing platforms, all add-on resources installed on any computing resources of the cloud computing platform and providing, to the platform orchestrator, information listing one or more add-on resources installed on the first plurality of nodes of the cloud computing platform.

6. The system of claim 1, wherein the add-on resource API command provided by the platform orchestrator to the respective platform controller of each of the first plurality of different cloud computing platforms comprises a command to delete the particular add-on resource installed on each of the first plurality of different cloud computing platforms, wherein executing the add-on resource API command comprises inspecting, by the respective platform controller of each of the first plurality of different cloud computing platforms, all instances of the particular add-on resource installed on any of the first plurality of nodes of each of the first plurality of different cloud computing platforms and removing, from each of the first plurality of different cloud computing platforms, all instances of the particular add-on resource installed on any of the first plurality of nodes of each of the first plurality of different cloud computing platforms.

7. The system of claim 1, wherein the add-on resource API command provided by the platform orchestrator to the respective platform controller of each of the first plurality of different cloud computing platforms comprises a command to update the particular add-on resource installed on each of the first plurality of different cloud computing platforms,
wherein executing the add-on resource API command comprises retrieving, by the respective platform controller of each of the first plurality of different cloud computing platforms, an updated version of the particular add-on resource and installing the updated version of the particular add-on resource.

8. The system of claim 1, wherein the first plurality of nodes are virtual machines or containers.

9. The distributed system of claim 1, wherein executing the add-on resource API command by the platform controller of a particular cloud computing platform of the first plurality of different cloud computing platforms does not require approval by any platform administrators of the particular cloud computing platform.

10. A computer-implemented method comprising:
receiving, by a platform orchestrator, an add-on resource application programming interface (API) command that requests a modification to a particular add-on resource installed on a first plurality of different cloud computing platforms that were each launched by the platform orchestrator, wherein:
the add-on resource API command does not specify the first plurality of different cloud computing platforms;
each of the first plurality of different cloud computing platform comprises: i) a platform controller that implements APIs to be used by the platform orchestrator for modifying add-on resources installed on the first plurality of different cloud computing platforms, and ii) a plurality of nodes that each of the first plurality of different cloud computing platforms is configured to use to execute workloads;
the particular add-on resource:
is a software component on one or more of the first plurality of nodes within each of the first plurality of different cloud computing platforms;
supports one or more functionalities of the add-on resource API;
is compatible with the first plurality of different cloud computing platforms; and
implements additional functionality for the workloads of the first plurality of different cloud computing platforms; and
providing, by the platform orchestrator to each platform controller of the first plurality of different cloud computing platforms launched by the platform orchestrator, a request to execute the add-on resource API command;
providing, by the platform orchestrator to each platform controller of a second plurality of cloud computing platforms launched by the platform orchestrator, a request to execute the add-on resource API command and
the request causing each of the platform controllers to retrieve, from a verified add-on system, the add-on resource API corresponding to the add-on resource API command to effectuate the modification to the particular add-on resource installed on the first plurality of different cloud computing platforms.

11. The method of claim 10, wherein the particular add-on resource comprises an add-on package received from an add-on developer entity and metadata identifying the add-on developer entity.

12. The method of claim 11, wherein the particular add-on resource is generated by verified add-on system that is distinct from an add-on developer system of the add-on developer entity.

13. The method of claim 12, wherein the platform controller of each of the first plurality of different cloud computing platforms is configured to install add-on resources retrieved from the verified add-on system.

14. The method of claim 10, wherein the add-on resource API command provided by the platform orchestrator to the respective platform controller of each of the first plurality of different cloud computing platforms comprises a command to retrieve a listing of add-on resources installed on each of the first plurality of different cloud computing platforms,
wherein executing the add-on resource API command comprises inspecting, by the respective platform controller of each of the first plurality of different cloud computing platforms, all add-on resources installed on any of the first plurality of nodes of each of the first plurality of different cloud computing platforms and providing, to the platform orchestrator, information listing one or more add-on resources installed on the first plurality of nodes of each of the first plurality of different cloud computing platforms.

15. The method of claim 10, wherein the add-on resource API command provided by the platform orchestrator to the respective platform controller of each of the first plurality of different cloud computing platforms comprises a command to delete the particular add-on resource installed on each of the first plurality of different cloud computing platforms,
wherein executing the add-on resource API command comprises inspecting, by the respective platform controller of each of the first plurality of different cloud computing platforms, all instances of the particular add-on resource installed on any of the first plurality of nodes of each of the first plurality of different cloud computing platforms and removing, from each of the first plurality of different cloud computing platforms, all instances of the particular add-on resource installed on any of the first plurality of nodes of each of the first plurality of different cloud computing platforms.

16. The method of claim 10, wherein the add-on resource API command provided by the platform orchestrator to the respective platform controller of each of the first plurality of different cloud computing platforms comprises a command to update the particular add-on resource installed on each of the first plurality of different cloud computing platforms,
wherein executing the add-on resource API command comprises retrieving, by the respective platform controller of each of the first plurality of different cloud computing platforms, an updated version of the particular add-on resource and installing the updated version of the particular add-on resource.

17. The method of claim 10, wherein executing the add-on resource API command by the platform controller of a particular cloud computing platform of the first plurality of different cloud computing platforms does not require approval by any platform administrators of the particular cloud computing platform.

18. One or more non-transitory computer storage media encoded with computer program instructions that when executed by one or more computers cause the one or more computers to perform operations comprising:
  receiving, by a platform orchestrator, an add-on resource application programming interface (API) command that requests a modification to a particular add-on resource installed on a plurality of different cloud computing platforms that were each launched by the platform orchestrator, wherein:
    the add-on resource API command does not specify the first plurality of different cloud computing platforms;
    each of the first plurality of different cloud computing platform comprises: i) a platform controller that implements APIs to be used by the platform orchestrator for modifying add-on resources installed on the first plurality of different cloud computing platforms, and ii) a plurality of nodes that each of the first plurality of different cloud computing platforms is configured to use to execute workloads;
    the particular add-on resource:
      is a software component on one or more of the first plurality of nodes within each of the first plurality of different cloud computing platforms;
      supports one or more functionalities of the add-on resource API;
      is compatible with the first plurality of different cloud computing platforms; and
      implements additional functionality for the workloads of the first plurality of different cloud computing platforms; and
  providing, by the platform orchestrator to each platform controller of the first plurality of different cloud computing platforms launched by the platform orchestrator, a request to execute the add-on resource API command;
  providing, by the platform orchestrator to each platform controller of a second plurality of cloud computing platforms launched by the platform orchestrator, a request to execute the add-on resource API command; and
  the request causing each of the platform controllers to retrieve, from a verified add-on system, the add-on resource API corresponding to the add-on resource API command to effectuate the modification to the particular add-on resource installed on the first plurality of different cloud computing platforms.

19. The non-transitory computer storage media of claim 18, wherein the particular add-on resource comprises an add-on package received from an add-on developer entity and metadata identifying the add-on developer entity.

20. The non-transitory computer storage media of claim 18, wherein executing the add-on resource API command by the platform controller of a particular cloud computing platform of the first plurality of different cloud computing platforms does not require approval by any platform administrators of the particular cloud computing platform.

21. The non-transitory computer storage media of claim 18, wherein the platform controller of each of the first plurality of different cloud computing platforms is configured to install add-on resources retrieved from the verified add-on system.

* * * * *